United States Patent [19]
Campbell et al.

[11] Patent Number: 5,835,470
[45] Date of Patent: Nov. 10, 1998

[54] SYSTEM AND METHOD FOR STEERING FOCAL PLANE DATA USING CYLINDRICAL COORDINATES TO ACCESS DATA LOCATIONS IN A HOLOGRAPHIC MEMORY

[75] Inventors: Scott Patrick Campbell, Chatham; Kevin Richard Curtis, Summit; Michael C. Tackitt, Califon, all of N.J.

[73] Assignee: Lucent Technologies Inc., Murray Hill, N.J.

[21] Appl. No.: 881,572

[22] Filed: Jun. 24, 1997

[51] Int. Cl.$^6$ ........................................................ G11B 7/00
[52] U.S. Cl. ................... 369/103; 369/44.17; 369/44.19; 369/44.21; 359/11; 359/29; 359/32; 365/216; 365/125
[58] Field of Search ................................ 369/103, 44.17, 369/44.19, 44.21; 359/11, 29, 32; 365/216, 125

[56] References Cited

U.S. PATENT DOCUMENTS

4,550,395  10/1985  Carlson .................................. 369/103
5,481,523   1/1996  Dewald .................................. 369/103

*Primary Examiner*—David C. Nelms
*Assistant Examiner*—Andrew Q. Tran

[57] ABSTRACT

Systems and methods for steering a complex, spatially-modulated incident beam of coherent light to gain access to data locations in a holographic memory cell (HMC). One of the systems includes: (1) a reflective element, locatable proximate a first focal plane of the incident beam, (2) a rotational steering mechanism, coupled to the reflective element, that orients the reflective element according to a desired rotational angle to steer the incident beam in a desired direction and (3) a refractive element that refracts the beam reflected from the reflective element to create a second focal plane for the beam, the HMC locatable proximate the second focal plane and rotatable about an axis of a plane thereof to receive the beam at a location thereon that is a function of the desired direction and an angular position of the HMC.

18 Claims, 5 Drawing Sheets

SYSTEM AND METHOD FOR STEERING FOCAL PLANE DATA USING CYLINDRICAL COORDINATES TO ACCESS DATA LOCATIONS IN A HOLOGRAPHIC MEMORY

TECHNICAL FIELD OF THE INVENTION

The present invention is directed, in general, to holographic memory cells (HMCs) and, more specifically, to an optical system for accessing data locations in a holographic memory.

CROSS-REFERENCE TO RELATED APPLICATIONS

The present invention is related to that disclosed in:
1. U.S. patent application Ser. No. 08/881,579, entitled "System and Method Using Linear Translation to Access Data Locations in a Holographic Memory" and filed concurrently herewith;
2. U.S. patent application Ser. No. 08/881,540, entitled "System and Method For Steering Focal Plane Data to Access Data Locations in a Holographic Memory" and filed concurrently herewith;
3. U.S. patent application Ser. No. 08/881,736, entitled "System and Method for Steering Fresnel Region Data to Access Data Locations in a Holographic Memory" and filed concurrently herewith;
4. U.S. patent application Ser. No. 08/881,886, entitled "System and Method for Precessing an Optical Path Using Cylindrical Coordinates to Access Data Locations in a Holographic Memory" and filed concurrently herewith; and
5. U.S. patent application Ser. No. 08/881,404, entitled "System and Method for Steering Fresnel Region Data Using Cylindrical Coordinates to Access Data Locations in a Holographic Memory" and filed concurrently herewith.

Each reference is commonly assigned with the present invention.

BACKGROUND OF THE INVENTION

Most modern processing systems, including personal computers (PCS), rely on one form or another of optical data storage. For example, CD-ROM drives are now standard equipment on nearly all new PCS. Nearly all multimedia software, including video games, maps, encyclopedias, and the like, are sold on CD-ROM. Also, compact discs are the most prevalent storage medium for musical recording. More recently, digital video disc (DVD) technology has been introduced that will expand the storage capacity of standard CD technology from about one-half gigabyte to about five gigabytes.

The large storage capacities and relatively low costs of CD-ROMs and DVDs have created an even greater demand for still larger and cheaper optical storage media. Many large businesses rely on jukebox-style CD changers in order to access a particular one of potentially hundreds of discs. Motion pictures released in optical storage format still require multiple CDS, DVDs or oversized laser discs. However, it appears that the limits of CD-ROM and DVD technology are being reached. In order to continue to improve the capacity and speed of optical storage systems, research increasingly focuses on holographic storage devices capable of storing hundreds of gigabytes in a CD-sized storage medium.

A number of holographic data storage systems have been developed that are capable of storing and retrieving an entire page of data at a time. In these systems, data to be stored is first encoded in a two dimensional (2D) optical array, for example on a liquid crystal display (LCD) screen, which is one type of spatial light modulator (SLM). Another type of SLM is Texas Instruments' Digital Mirror Device, which is a reflective device that allows the reflectivity of each pixel to be changed. The term "SLM" also includes fixed masks of varying optical density, phase, or reflectivity.

A first laser beam, a plane wave, is transmitted through the SLM and picks up an intensity and/or phase pattern from the data squares and rectangles (pixels) in the 2D array. This data-encoded beam, called an object beam, is ultimately projected onto and into a light-sensitive material, called a holographic memory cell (HMC). A second laser beam, called a reference beam, is also projected onto and into the holographic memory cell. The object beam and the reference beam then cross to produce an interference pattern throughout a volume element of the HMC. This unique interference pattern induces material alterations in the HMC that generate a hologram.

The formation of the hologram in the holographic memory cell is a function of the relative amplitudes and polarization states of, and the phase differences between, the object beam and the reference beam. It is also highly dependent on the incident angles at which the object beam and the reference beam were projected onto the holographic memory cell. After hologram storage, the data beam may be reconstructed by projecting into the HMC a reference beam that is the same as the reference beam that produced the hologram. The hologram and the reference beam then interact to reproduce the data-encoded object beam, which may then be projected onto a two-dimensional array of light sensitive detectors which read back the data by sensing the pattern of light and dark pixels.

The object beam produced by the spatial light modulator has a high space-bandwidth product (SBP). The SBP of a beam is equal to the number of resolvable pixels the beam contains. For example, the 800×600 pixel image produced by a SVGA computer monitor has a SBP of 480,000. When high SBP beams are projected into a holographic memory cell, it is important to keep the optical path lengths traversed by the beams constant. Otherwise, the high SBP image will go out of focus and the data will be lost.

Maintaining a constant optical path length in order to keep the high SBP image of the object beam in focus necessarily makes it difficult to steer the object beam to different areas on the surface of the holographic memory cell, because such steering frequently causes the optical path length to change. However, many holographic memory systems incorporate reference beams whose SBP=1. Because of the small reference beam SBP, such a holographic data storage system can project its reference beam through an acousto-optic cell, which diffracts the reference beam through an optical system, such as a 4-f imaging system, that has a fixed optical path length. Altering the frequency of the acoustic wave changes the angle at which the reference beam is diffracted and therefore incident to the surface of the holographic memory cell. Systems using such angle-tuned reference beam steering are known as "angle multiplexing" systems and are distinguished by their capability to project different pages of data into the same location on the surface of the holographic memory cell, but at different angles of reference-beam incidence. The data is then retrieved by steering the interrogating reference beam at different angles of incidence. However, these prior art systems are inadequate to steer a high SBP beam, such as a typical object beam, to different areas of the holographic memory cell because of their inherent limitations with respect to space-bandwidth product throughput. These prior art systems are also limited in their capability to accurately position a high SBP object or reference beam at a desired position on the holographic memory cell.

Accordingly, there is a need in the art for improved optical systems that are capable of steering high space-bandwidth product beams to different regions on the surface of a holographic memory cell without causing the beam to lose focus. There is a further need in the art for improved optical systems capable of steering high space-bandwidth product images in more than one dimension in a coordinate system. There is a still further need in the art for improved optical systems capable of steering complex reference beams in more than one dimension in a coordinate system.

SUMMARY OF THE INVENTION

To address the above-discussed deficiencies of the prior art, the present invention provides systems and methods for steering a complex, spatially-modulated incident beam of coherent light to gain access to data locations in an HMC. One of the systems includes: (1) a reflective element, locatable proximate a first focal plane of the incident beam, (2) a rotational steering mechanism, coupled to the reflective element, that orients the reflective element according to a desired rotational angle to steer the incident beam in a desired direction and (3) a refractive element that refracts the beam reflected from the reflective element to create a second focal plane for the beam, the HMC locatable proximate the second focal plane and rotatable about an axis of a plane thereof to receive the beam at a location thereon that is a function of the desired direction and an angular position of the HMC.

The present invention therefore introduces the broad concept of rotating a reflective element, such as a mirror, and the HMC itself to read or write to different locations on the HMC.

In one embodiment of the present invention, the first focal plane is a Fourier plane. Alternatively, the first focal plane may be an image plane.

In one embodiment of the present invention, the second focal plane is an image plane. Alternatively, the second focal plane may be a Fourier plane.

In one embodiment of the present invention, the refractive element is a convex lens. Alternatively, the refractive element may be a concave lens, provided that other elements are included to focus the beam.

In one embodiment of the present invention, the HMC is substantially planar. However, the present invention is employable with nonplanar HMCs, should they be advantageous in a given application.

In one embodiment of the present invention, the system further comprises: (1) a second reflective element, locatable proximate the second focal plane, (2) a second rotational steering mechanism, coupled to the second reflective element, that orients the second reflective element according to a second desired rotational angle to steer the incident beam in a second desired direction and (3) a second refractive element that refracts the beam reflected from the second reflective element to create a third focal plane for the beam, the location on the HMC further being a function of the second desired direction. The (first) reflective element and the second reflective element cooperate to provide radial steering for the beam.

The foregoing has outlined, rather broadly, various embodiments of the present invention so that those skilled in the art may better understand the detailed description of the invention that follows. More specific embodiments of the invention will be described hereinafter that form the subject of the claims of the invention. Those skilled in the art should appreciate that they can readily use the disclosed conception and specific embodiments as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
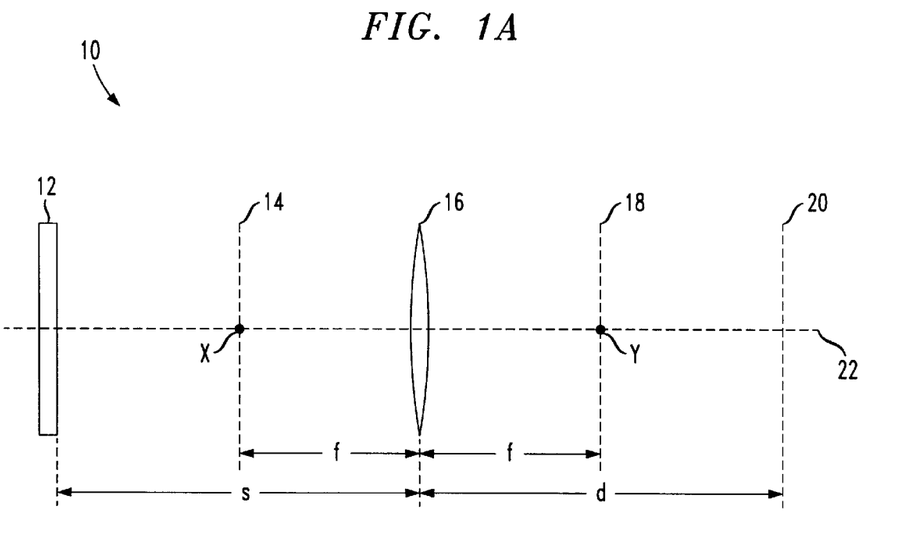
FIG. 1A illustrates a conventional single lens imaging system.

FIG. 1A illustrates a conventional single lens imaging system 10. Although single lens systems are well known, single lens system 10 is described here in detail so that the descriptions of the present invention which follow may be more clearly understood. Single lens system 10 comprises spatial light modulator (SLM) 12 and thin convex lens 16. Lens 16 has two focal points. Focal point X lies in plane 14, shown as a dotted line, one focal length, f, away from lens 16. On the opposite side of lens 16, focal point Y lies in plane 18, shown as a dotted line, one focal length, f, away from lens 16. SLM 12 comprises, for example, a liquid crystal display (LCD) screen on which data is encoded in a two-dimensional (2D) pattern of transparent and opaque pixels. SLM 12 and lens 16 are positioned orthogonally to optical path 22, shown as a dotted line. If a thin lens having a focal length, f, is positioned at a distance, s, from an input object, the lens will form an output image at a distance, d, on the opposite side of the lens, according to the thin lens equation: $1/f=(1/s+1/d)$. In the configuration shown in FIG. 1A, SLM 12 is positioned at a distance, s, from lens 16, so that the output image of SLM 12 is formed at plane 20, shown as a dotted line, at a distance, d, away from lens 16. In selected embodiments of the present invention described below, s, d, and f are selected so that $s=d=2f$, and the total separation, s+d, between SLM 12 and its output image is therefore 4f.

Figure 1B:
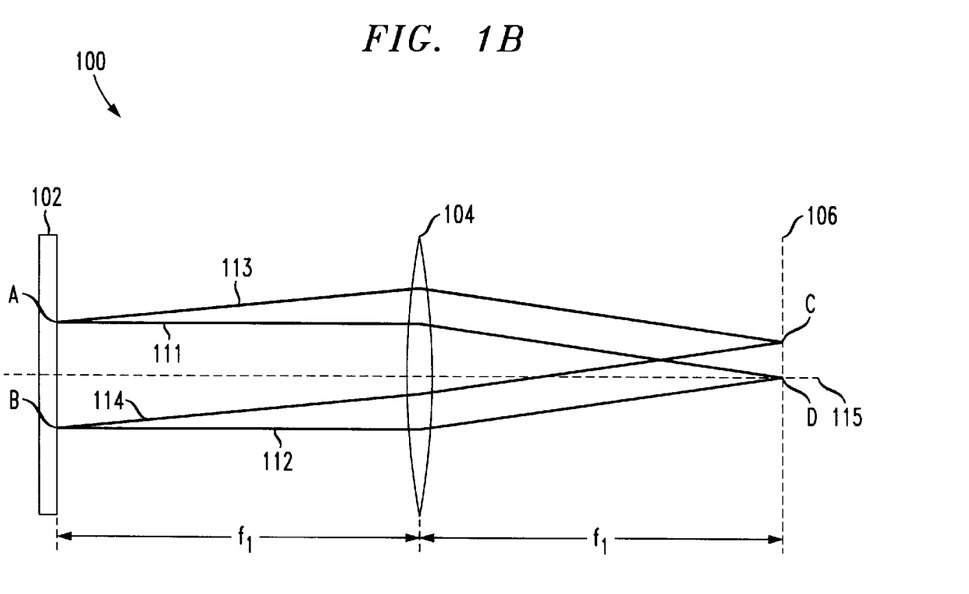
FIG. 1B illustrates a conventional single lens Fourier transforming system.

FIG. 1B illustrates a conventional single lens Fourier transforming system 100. Although Fourier transforms of input objects are well known, Fourier transform system 100 is described here in detail so that the descriptions of the present invention which follow may be more clearly understood. An object beam of coherent laser light is projected through SLM 102 and picks up the encoded data pattern and propagates distance $f_1$ to reach lens 104. The object beam passes through lens 104 and propagates distance $f_1$ again to reach Fourier plane 106. At the Fourier plane, all of the object beam's positional information becomes angular information and all of the object beam's angular information becomes positional information.

This phenomenon may be understood by reference to light beams 111 and 113, which emanate from point A on SLM 102, and to light beams 112 and 114, which emanate from point B on SLM 102. The small pixels in the 2D-array pattern on SLM 102 form small apertures that cause diffraction of the object beam as it passes through SLM 102. Thus, light emanates outward from points A and B over a broad range of directions. Light beams 111 and 112 are parallel to one another and propagate perpendicularly outward from SLM 102. Light beams 113 and 114 are also parallel to one another but propagate outward at an oblique angle from SLM 102. Since light beams 111 and 112 are parallel, their angles of incidence at lens 104 are the same. Similarly, since light beams 113 and 114 are parallel, their angles of incidence at lens 104 are the same.

As is well known, it is a property of a thin lens, such as lens 104, that parallel light beams that pass through the lens are focused (converged) by the lens to the same point at the Fourier plane. Thus, parallel beams 111 and 112 converge at point D in Fourier plane 106, even though beams 111 and 112 emanate from different points at SLM 102. Similarly, parallel beams 113 and 114 converge at point C in Fourier plane 106, even though beams 113 and 114 emanate from different points at SLM 102.

It is also a property of a thin lens, such as lens 104, that light beams emanating at different angles (i.e., nonparallel) from the same point at the input object (SLM 102) become parallel light beams after passing through the thin lens. Thus, light beams 111 and 113, which emanate at different angles (i.e., nonparallel) from point A at SLM 102, become parallel to each other after passing through lens 104 and therefore have the same angles of incidence at points C and D in Fourier plane 106. Likewise, light beams 112 and 114, which emanate at different angles (i.e., nonparallel) from point B at SLM 102, become parallel to each other after passing through lens 104 and therefore have the same angles of incidence at points C and D in Fourier plane 106.

From the foregoing, it can be seen that the position at which a beam of light is incident on Fourier plane 106 is determined by the angle (not the position) at which it left SLM 102. Similarly, it can be seen that the angle at which a beam of light is incident on Fourier plane 106 is determined by the position (not the angle) at which it left SLM 102. Therefore, as was stated above, at the Fourier plane, all of the object beam's positional information becomes angular information and all of the object beam's angular information becomes positional information.

Figure 2:
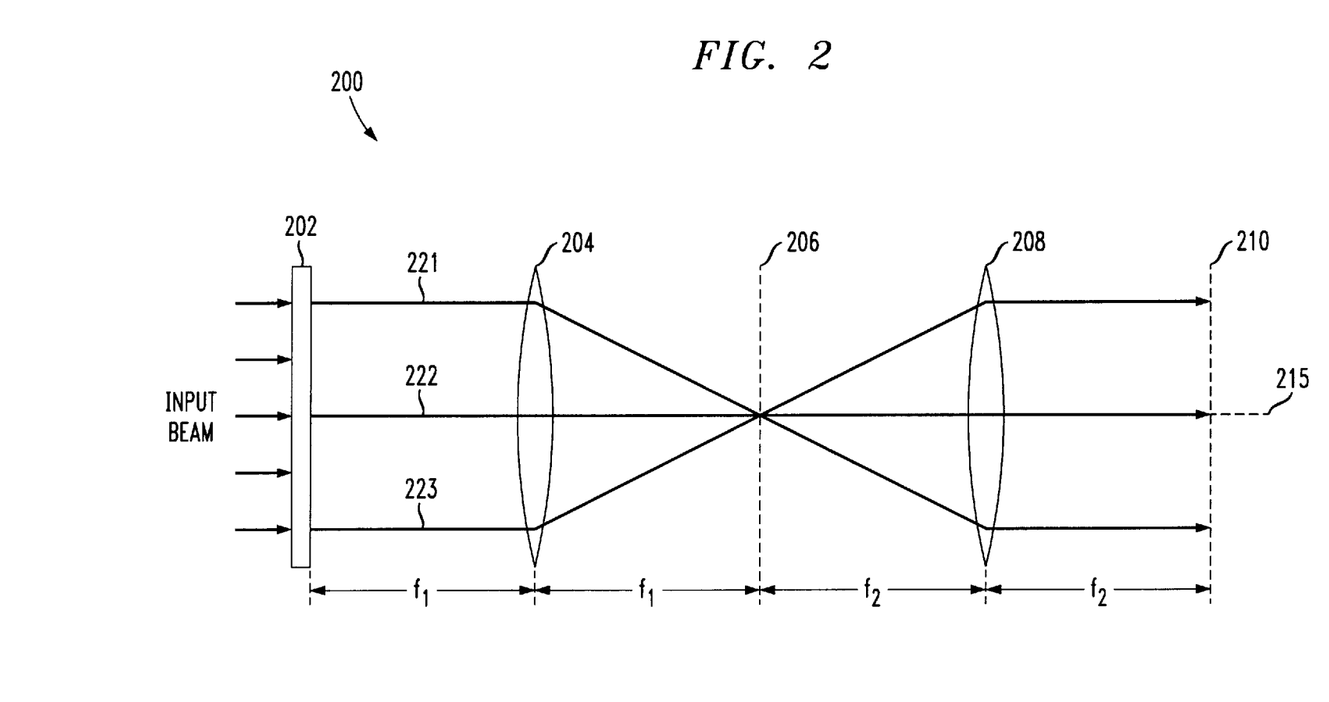
FIG. 2 illustrates a conventional 4-f (four f) imaging system.

FIG. 2 illustrates a conventional 4-f (four f) imaging system 200. The configuration of 4-f imaging system 200 shown in FIG. 2 is referred to as "infinite conjugate." Although 4-f imaging systems are well known, 4-f imaging system 200 is described here in detail so that the descriptions of the present invention which follow may be more clearly understood. 4-f imaging system 200 comprises spatial light modulator (SLM) 202, thin convex lens 204, which has a focal length, $f_1$, and thin convex lens 208, which has a focal length, $f_2$, where $f_1$ and $f_2$ may or may not be equal. SLM 202 comprises, for example, a liquid crystal display (LCD) screen on which data is encoded in a 2D-array pattern of transparent and opaque pixels. SLM 202, lens 204 and lens 208 are positioned orthogonally to optical path 215, shown as a dotted line conincident with solid line 222.

A plane wave object beam of coherent laser light is projected through SLM 202, picks up the encoded data pattern, and propagates distance $f_1$ to reach lens 204. The object beam, represented by light beams 221–223, passes through lens 204 and propagates distance $f_1$ again to reach Fourier plane 206. As explained above with respect to FIG. 1B, at Fourier plane 206, all of the object beam's positional information becomes angular information and all of the object beam's angular information becomes positional information.

The image formed at Fourier plane 206 is the input object for lens 208. From Fourier plane 206, the object beam propagates distance $f_2$ to reach lens 208. After passing through lens 208, the object beam finally propagates distance $f_2$ to reach output image plane 210, where the input data image at SLM 202 is reconstructed. Output image plane 210 is the Fourier plane for plane 206, as well as the output image plane for the plane in which SLM 202 lies. Thus, the image formed at output image plane 210 by lens 208 is the Fourier image of the Fourier image formed at Fourier plane 206 by lens 204.

As light beams 221–223 show, the input data image formed at output image plane 210 is inverted with respect to its appearance at SLM 202. Therefore, if a holographic memory cell was positioned at output image plane 210, the inverted image of the 2D-array pattern at SLM 202 would be stored as a page of data in the holographic memory cell. A separate reference beam of laser light (not shown) would be required in order to store the data image.

In alternate embodiments of the above-described optical systems, the spatial light modulator may be positioned between the initial lens and the following Fourier plane. An object beam that is incident to the initial lens will be converged by the initial lens, but will pick up the encoded data from the SLM after, rather than before, the initial lens. In such a configuration, the size (positions) of the Fourier orders vary linearly with the distance between the SLM and the following Fourier plane. Additionally, the incident angles of the beams will vary according to the position of the SLM.

The beam steering systems disclosed in the co-pending applications filed concurrently with the present disclosure translate focal planes containing image data or Fourier transform data at the surface of holographic memory cells. These systems generally comprise one or more mirrors and usually at least one refractive element, such as a convex lens, that steer an object beam in one or two dimensions in a Euclidean (also called Cartesian or rectangular) coordinate system. However, beam steering techniques may also be used in a cylindrical (or polar) coordinate system. The present invention discloses systems and methods for cylindrically steering an object beam.

Figure 3:
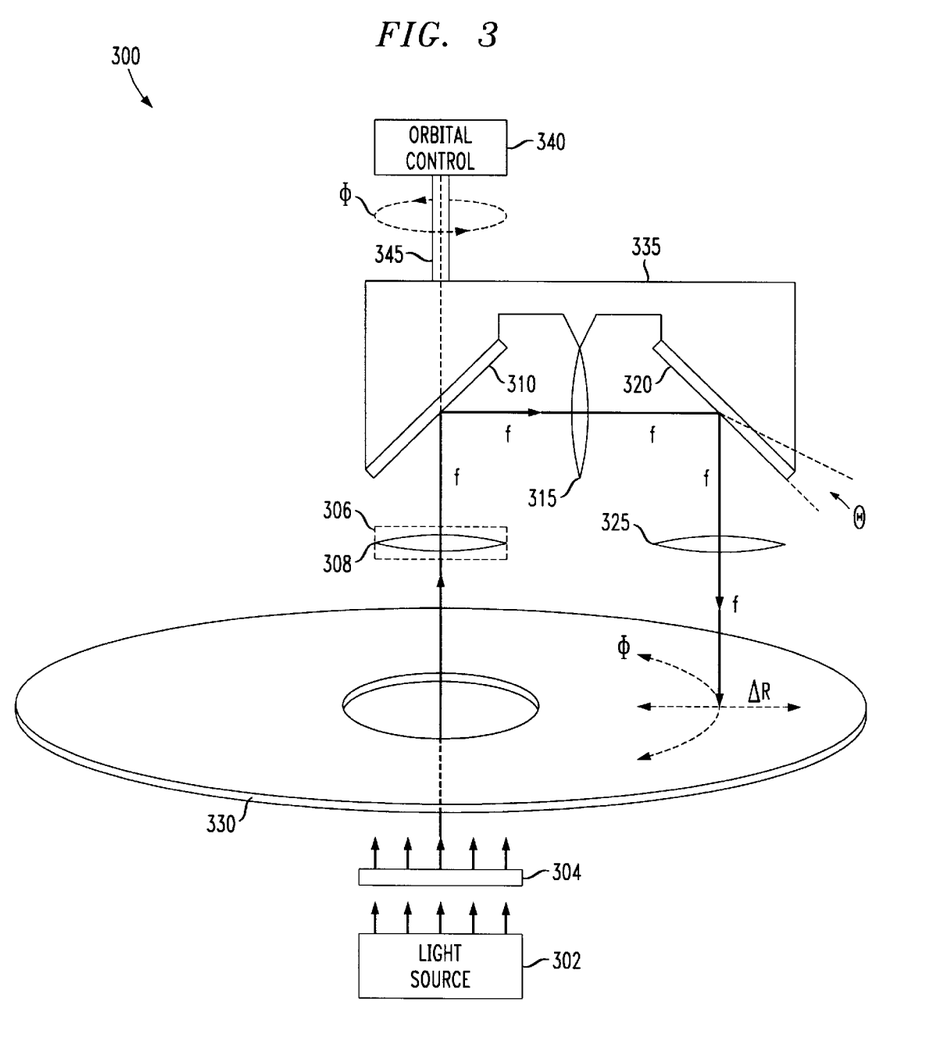
FIG. 3 illustrates a focal plane beam steering system according to a first embodiment of the present invention.

FIG. 3 illustrates focal plane beam steering system 300 according to a first embodiment of the present invention. Beam steering system 300 comprises light source 302, spatial light modulator 304, imaging system 306, and an orbiting optical system comprising fixed mirror 310, lens 315, rotatable mirror 320 and lens 325. Beam steering system 300 also comprises holographic memory cell (HMC) 330, orbital control 340 and drive shaft 345.

Light source 302 emits a planar wave object beam, such as a beam of coherent laser light, towards spatial light modulator (SLM) 304. SLM 304 comprises, for example, a liquid crystal display (LCD) screen on which data is encoded in a two-dimensional (2D) pattern of transparent and opaque pixels. The data-encoded object beam is transmitted through a hole in the center of HMC 300 and eventually passes through imaging system 306, such as the single lens imaging system in FIG. 1A, or the 4-f imaging system in FIG. 2.

Lens 308 is representative of the last lens in imaging system 306 through which the object beam passes and therefore may be the equivalent of lens 16 in FIG. 1A or the equivalent of lens 208 in FIG. 2. Fixed mirror 310 is positioned one focal length, f, away from lens 308. Fixed mirror 310, therefore, is positioned at either the Fourier focal plane or the output image focal plane of the input object (SLM 304) transmitted through imaging system 306. In either case, fixed mirror 310 reflects the Fourier or image focal plane image of the input object through lens 315 and towards rotatable mirror 320.

The image reflected by fixed mirror 310 is the input object for lens 315. Lens 315 is positioned one focal length, f, away from fixed mirror 310 and rotatable mirror 320 is positioned one focal length, f, away from lens 315. The image formed on fixed mirror 310 is the input object to lens 315, which produces its own Fourier transform at rotatable mirror 320. Lens 325 is positioned one focal length, f, away from rotatable mirror 320 and HMC 330 is positioned one focal length, f, away from lens 325. The image formed on rotatable mirror 320 is the input object to lens 325, which produces its own Fourier transform at HMC 330.

Lens 315, rotatable mirror 320 and lens 325 essentially form a 4-f imaging system with rotatable mirror 320 positioned at the Fourier focal plane of the first lens (lens 315) in order to steer the object beam. Thus, the output image formed on HMC 330 is an inversion of the input object transmitted from fixed mirror 310.

Rotatable mirror 320 rotates through an angle, θ, and the beams reflected from rotatable mirror 320 are then subsequently imaged through lens 325 onto HMC 330. It will be recalled that positional information at the input object plane becomes angular information at the Fourier transform plane and that angular information at the input object plane becomes positional information at the Fourier transform plane. Therefore, the angular displacement, θ, of the image reflected from rotatable mirror 320 produces a corresponding positional displacement, ΔR, of the image reflected by mirror 320 at HMC 330. This means that rotation of mirror 320 from a first or "original" position to a second or "rotated" position produces a displacement, ΔR, of the image at HMC 330, where ΔR=f(tan θ). The absolute radius, R, in the polar coordinate system is determined by the offset attributable to the length of drive arm 335 and the value of θ.

Regardless of the angle to which mirror 320 rotates, the image at HMC 330 will remain nearly in focus while moderate ranges of ΔR are scanned. This is true because the optical path lengths for all beams are equal, even though the physical path length of a beam passing through the center of the lens at a zero degree mirror rotation is shorter than the physical path length of a beam passing through the edges of the lens at a non-zero degree mirror rotation.

Fixed mirror 310, lens 315, and rotatable mirror 320 are rigidly mounted on drive arm 335 in fixed positions relative to each other. For a given angle, θ, of rotatable mirror 320, the radius R is fixed. Orbital control 340 orbits drive arm 335 through a full 360° orbit, according to the orbital angle, φ. Thus the image that is reflected from rotatable mirror 320 onto the surface of HMC 330 may be steered in a polar coordinate system, (R,φ), according to the values of φ and θ.

Figure 4:
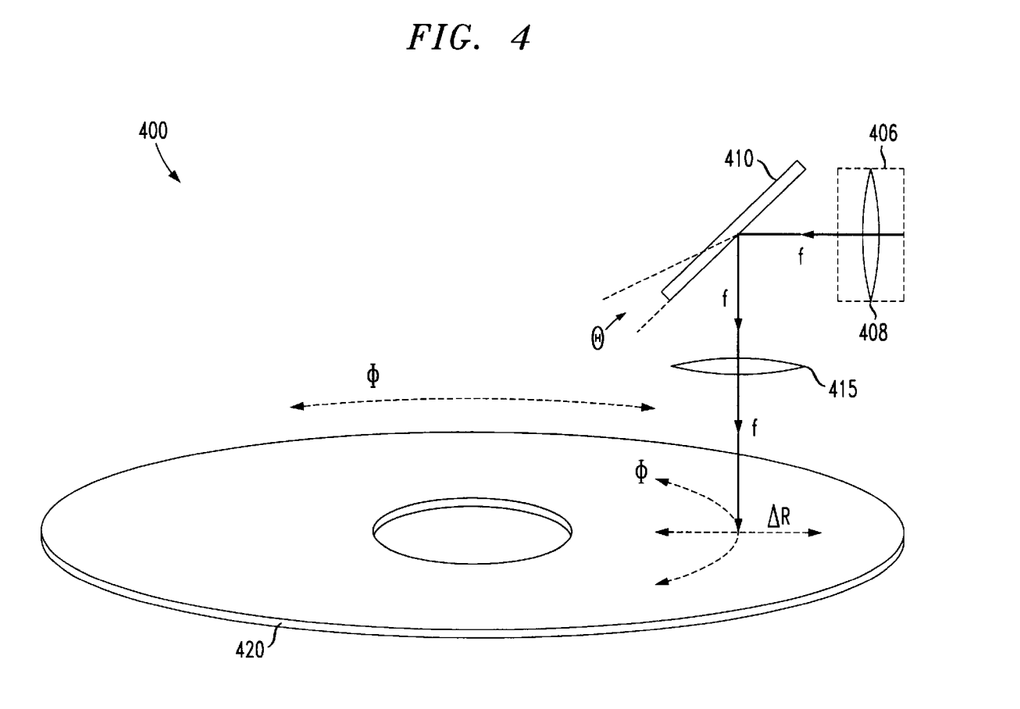
FIG. 4 illustrates a focal plane beam steering system according to a second embodiment of the present invention.

FIG. 4 illustrates focal plane beam steering system 400 according to a second embodiment of the present invention. Beam steering system 400 comprises a light source, a spatial light modulator (SLM), imaging system 406, rotatable mirror 410, lens 415 and holographic memory cell (HMC) 420. For simplicity, the light source and the SLM are not shown. In contrast to beam steering system 300, the holographic memory cell is rotated in order to provide an orbital angle, φ, in the polar coordinate system.

The light source emits a planar wave object beam, such as a beam of coherent laser light, towards the SLM. The SLM comprises, for example, a liquid crystal display (LCD) screen on which data is encoded in a two-dimensional (2D) pattern of transparent and opaque pixels. The data-encoded object beam is transmitted from the SLM and eventually passes through imaging system 406, such as the single lens imaging system in FIG. 1A, or the 4-f imaging system in FIG. 2.

Lens 408 is representative of the last lens in imaging system 406 through which the object beam passes and therefore may be the equivalent of lens 16 in FIG. 1A or the equivalent of lens 208 in FIG. 2. Rotatable mirror 410 is positioned one focal length, f, away from lens 408. Rotatable mirror 410, therefore, is positioned at either the Fourier focal plane or the output image focal plane of the input object (the SLM) transmitted through imaging system 406. In either case, rotatable mirror 410 reflects the Fourier or image focal plane image of the input object through lens 415 and onto the surface of HMC 420.

Rotatable mirror 410 rotates through an angle, θ, and the beams reflected from rotatable mirror 410 are then subsequently imaged through lens 415 onto HMC 420. Rotation of mirror 420 from a first or "original" position to a second or "rotated" position produces a displacement, ΔR, of the image at HMC 420, where ΔR=f(tan θ). The absolute radius, R, in the polar coordinate system is determined by the offset attributable to the relative position of mirror 410 with respect to the center of HMC 420 and the value of θ. Finally, the orbital angle, φ, in polar coordinate system (R, φ) is given by the orbital position of HMC 420. HMC 420 can be orbited through a full 360° rotation.

In alternate embodiments of the present invention, the steering systems described above may be used for coarse control steering of the object beam across the holographic memory cell, while fine control scanning may be achieved by physically translating the SLM before imaging. It will be appreciated by those skilled in the art that translating the SLM by an amount R produces a translation of the output image by an amount $-R(f_2/f_1)$ in a 4-f imaging system, where $f_1$ is the focal length of the first lens the object beam encounters and $f_2$ is the focal length of the second lens the object beam encounters. It will also be appreciated by those skilled in the art that translating the SLM by an amount R produces a translation of the output image by an amount $-R(d/s)$ in a single lens imaging system.

Image steering systems that translate the SLM are described in greater detail in U.S. patent application Ser. No. 08/881,579, entitled "System and Method Using Linear Translation to Access Data Locations in a Holographic Memory" and filed concurrently herewith.

The one-dimensional (1D) and two-dimensional (2D) beam steering systems may be further improved by using a "mirror image" setup of mirrors and lenses on the opposing side of the holographic memory cell. In this way, data may be steered onto two sides of the HMC simultaneously. As will be explained below in connection with FIG. 5, a "mirror image" optical setup on the opposing side of the HMC may also be used to retrieve data from the HMC, if the spatial light modulator is replaced with a two-dimensional array of light sensitive detectors.

Figure 5:
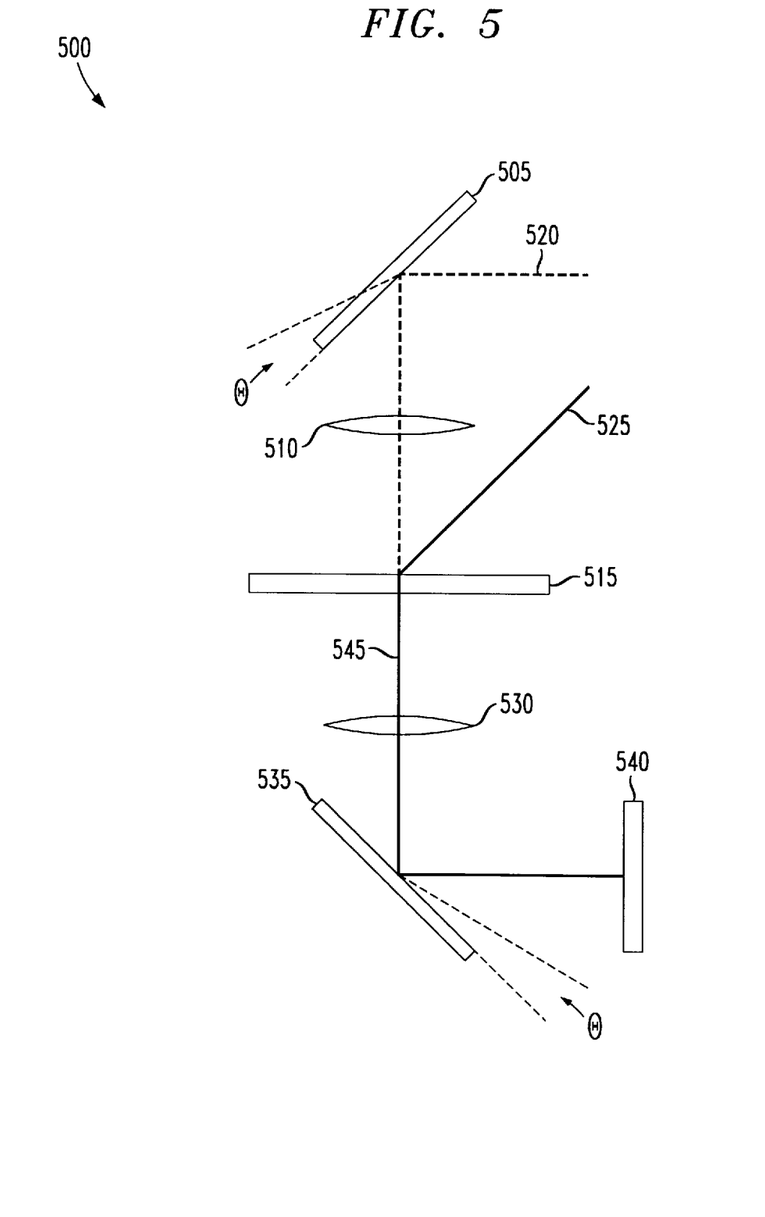
FIG. 5 illustrates a holographic memory system according to a third embodiment of the present invention.

FIG. 5 illustrates holographic memory system 500 according to a third embodiment of the present invention. Mirror 505 and lens 510 comprise a beam steering system for steering object beam 520 (shown as a dotted line) onto orbiting HMC 515. Object beam 520 may be received from either a 4-f imaging system or a single lens imaging system.

As previously described, reference beam 525 (shown as a solid line) and object beam 520 interact to produce a holographic image at a selected position. The position is determined by the tilt angle, θ, of mirror 505 and the orbital angle, φ, of HMC 515. The hologram is a function of the relative amplitudes and polarization states of, and the phase differences between, object beam 520 and reference beam 525, and the angles at which object beam 520 and reference beam 525 are projected onto HMC 515.

Data is retrieved using lens 530 and mirror 535, which comprise a "mirror image" of lens 510 and mirror 505. Object beam 520 may be reconstructed by projecting reference beam 525 into HMC 515 at the same angle and position used to produce the hologram. The hologram and reference beam 525 interact to reproduce the reconstructed object beam 545 (shown as a solid line). The desired data page may be selected by rotating mirror 535 to the same angle, θ, to which mirror 505 was rotated when the holograph was formed. Reconstructed object beam 545 is then projected onto light sensitive detector 540, which reads back the data by sensing the pattern of light and dark pixels. Advantageously, lens 530 and mirror 535 not only "de-steer" reconstructed object beam 545 onto detector 540, but they also correct for off-axis distortion effects that may be caused by mirror 505 and lens 510.

Although the above-described beam steering systems are used to steer an object beam to selected positions on a holographic memory cell, this is by way of illustration only and should not be construed to limit the scope of the present invention in any way. Those skilled in the art will appreciate that the beam steering systems disclosed herein may be readily adapted to steer a reference beam instead.

Although the present invention has been described in detail, those skilled in the art should understand that they can make various changes, substitutions and alterations herein without departing from the spirit and scope of the invention in its broadest form.

What is claimed is:

1. A system for steering a complex, spatially-modulated incident beam of coherent light to gain access to data locations in a holographic memory cell (HMC), comprising:
    a reflective element, locatable proximate a first focal plane of the complex, spatially-modulated incident beam of light;
    a rotational steering mechanism, coupled to said reflective element, that orients said reflective element according to a desired rotational angle to steer said incident beam in a desired direction; and
    a refractive element that refracts said beam reflected from said reflective element to create a second focal plane for said beam, said HMC locatable proximate said second focal plane and rotatable about an axis of a plane thereof to receive said beam at a location thereon that is a function of said desired direction and an angular position of said HMC.

2. The system as recited in claim 1 wherein said first focal plane is a Fourier plane.

3. The system as recited in claim 1 wherein said second focal plane is an image plane.

4. The system as recited in claim 1 further comprising an incident beam of coherent light having a space bandwidth product (SBP) of at least 100.

5. The system as recited in claim 1 wherein said reflective element is a mirror.

6. The system as recited in claim 1 wherein said refractive element is a convex lens.

7. A method of steering an optical path to gain access to data locations in a holographic memory cell (HMC), comprising the steps of:
    orienting a reflective element, locatable proximate a first focal plane of a complex, spatially-modulated incident beam of light, according to a desired rotational angle to steer said incident beam in a desired direction;
    refracting said beam reflected from said reflective element through a refractive element to create a second focal plane for said beam, said HMC locatable proximate said second focal plane; and
    rotating said HMC about an axis of a plane thereof to receive said beam at a location thereon that is a function of said desired direction and an angular position of said HMC.

8. The method as recited in claim 7 wherein said first focal plane is a Fourier plane.

9. The method as recited in claim 7 wherein said second focal plane is an image plane.

10. The method as recited in claim 7 further comprising the step of radiating an incident beam of coherent light having a space bandwidth product (SBP) of at least 100.

11. The method as recited in claim 7 wherein said reflective element is a mirror.

12. The method as recited in claim 7 wherein said refractive element is a convex lens.

13. A system for storing data, comprising:
    a light source;
    a spatial light modulator located to modulate a complex, spatially-modulated beam of light received from said light source;
    a reflective element, locatable proximate a first focal plane of said beam;
    a rotational steering mechanism, coupled to said reflective element, that orients said reflective element according to a desired rotational angle to steer said beam in a desired direction;
    a refractive element that refracts said beam reflected from said reflective element to create a second focal plane for said beam; and
    a holographic memory cell (HMC) located proximate said second focal plane and rotatable about an axis of a plane thereof to receive said beam at a location thereon that is a function of said desired direction and an angular position of said HMC.

14. The system as recited in claim 13 wherein said first focal plane is a Fourier plane.

15. The system as recited in claim 13 wherein said second focal plane is an image plane.

16. The system as recited in claim 13 further comprising an incident beam of coherent light having a space bandwidth product (SBP) of at least 100.

17. The system as recited in claim 13 wherein said reflective element is a mirror.

18. The system as recited in claim 13 wherein said refractive element is a convex lens.

* * * * *